United States Patent [19]

Okada et al.

[11] Patent Number: 4,770,566

[45] Date of Patent: Sep. 13, 1988

[54] SLIDE FASTENER OVERTURNING CONVEYER

[75] Inventors: Yozo Okada, Toyama; Akiyoshi Kando, Uozu, both of Japan

[73] Assignee: Yoshida Kogyo K. K., Tokyo, Japan

[21] Appl. No.: 38,663

[22] Filed: Apr. 15, 1987

[30] Foreign Application Priority Data

Apr. 15, 1986 [JP] Japan .................................. 61-86285

[51] Int. Cl.4 ............................................. B65G 53/24
[52] U.S. Cl. ..................................... 406/151; 406/108; 406/51; 406/88; 414/765; 198/403; 198/493
[58] Field of Search ............... 198/403, 404, 493, 401, 198/464.2, 502.2; 406/108, 151, 51, 87, 88; 414/764, 765, 766

[56] References Cited

U.S. PATENT DOCUMENTS

| | | | |
|---|---|---|---|
| 3,547,279 | 12/1970 | Radomski | 414/765 |
| 3,575,105 | 4/1971 | Painter | 414/766 X |
| 3,622,151 | 11/1971 | Range et al. | 406/87 |
| 3,873,163 | 3/1975 | Gladish | 406/88 |
| 4,159,824 | 7/1979 | Stange et al. | 271/3 |
| 4,165,006 | 8/1979 | Brusa | 198/403 X |

FOREIGN PATENT DOCUMENTS

| | | |
|---|---|---|
| 0109643 | 5/1984 | European Pat. Off. . |
| 2161320 | 6/1973 | France . |
| 52-10263 | 3/1977 | Japan . |
| 55-34088 | 9/1980 | Japan . |

*Primary Examiner*—Robert J. Spar
*Assistant Examiner*—Cheryl L. Gastineau
*Attorney, Agent, or Firm*—Hill, Van Santen, Steadman & Simpson

[57] ABSTRACT

A slide fastener overturning conveyer includes an elongate hollow rectangular guide member having a guide channel for the passage of a slide fastener, and air nozzles disposed adjacent to an inlet of the guide channel and directed toward an outlet of the guide channel. The guide member is rotatably movable about its longitudinal central axis through an angle of 180 degrees for overturning the slide fastener while the latter is received in the guide member. The air nozzles eject a compressed air to convey the overturned slide fastener. The angular movement of the guide member and the compressed-air ejection are controlled by a sensor provided for detecting leading and trailing ends of the slide fastener. The overturning conveyer thus constructed is relatively small and simple in construction and is effectively operative even when a slide fastener is relatively long.

6 Claims, 3 Drawing Sheets

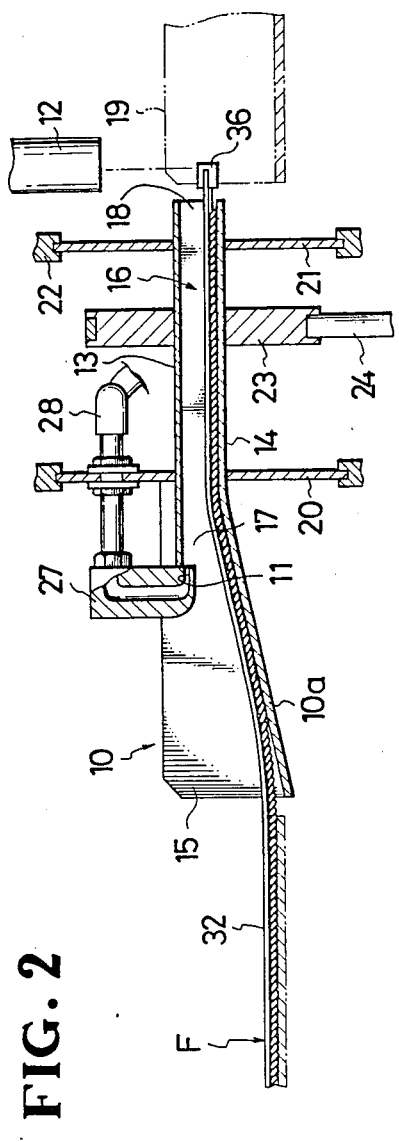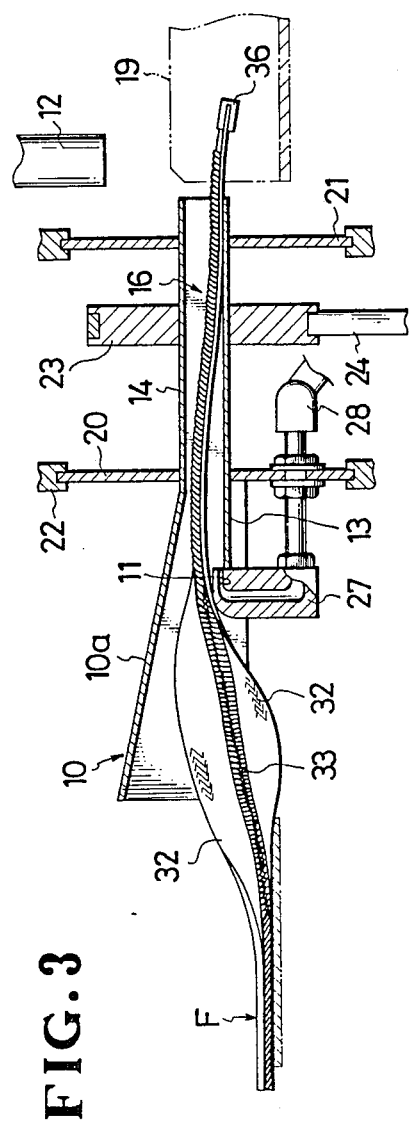

SLIDE FASTENER OVERTURNING CONVEYER

BACKGROUND OF THE INVENTION

1. Field of the Invention

The present invention relates to a conveyer for overturning slide fasteners while conveying them from a processing or finishing station to a packaging station.

2. Prior Art

In the manufacture of slide fasteners, a continuous slide fastener chain with sliders mounted thereon is horizontally fed through successive processing stations, such as a top end-stop applying station and a chain severing station. During that time, the slide fastener stringers are kept upside down to hold the respective slider pull tabs in a vertically depending posture so as not to hinder processing to be achieved at the foregoing stations. Then the severed or finished slide fasteners are delivered to a packaging station in which instance the slide fasteners must be turned over for enabling convenient packaging. To this end, various apparatus have been proposed for overturning the finished slide fasteners.

One example of such proposed apparatus is disclosed in Japanese Patent Publication No. 52-10263. The disclosed apparatus comprises, as shown in FIG. 7 of the accompanying sheets of drawing, an overturning plate A pivotably disposed between adjacent ends of two belt conveyers for overturning upside-down slide fasteners B as they are delivered from one conveyer to the other conveyer. Another overturning apparatus disclosed in Japanese Patent Publication No. 55-34088 comprises, as illustrated here in FIG. 8, a pivotable pallet C disposed below a discharge unit for receiving thereon upside-down slide fasteners B, the pallet being angularly movable to throw the slide fasteners onto a lower belt conveyer during which time the slide fasteners are overturned.

The known overturning plate or pallet is complicated in construction and is difficult to operate reliably. Furthermore, such apparatus is not suitable for use with a relatively long slide fastener such as a separable slide fastener because such long slide fastener is likely to twist when thrown toward the conveyer. The slide fasteners discharged onto the conveyer are likely to become at random with the result that packaging of the finished slide fasteners is difficult to achieve.

SUMMARY OF THE INVENTION

It is accordingly an object of the present invention to provide a slide fastener overturning conveyer which is small and simple in construction and reliable in operation, is capable of discharging the slide fasteners in neatly oriented disposition, and is effectively useful for the conveyance of relatively long slide fasteners.

According to the present invention, the foregoing and other object of the present invention are attained by a slide fastener overturning conveyer comprising an elongate hollow rectangular guide member having a longitudinal guide channel for the passage of a slide fastener and rotatably movable about its longitudinal central axis through an angle of 180 degrees, at least one air nozzle mounted in the guide member and disposed adjacent to an inlet of the guide channel for ejecting compressed air therefrom toward an outlet of the guide channel, a sensor disposed adjacent to the outlet of the guide channel for detecting leading and trailing ends of the slide fastener, drive means operatively controlled by the sensor for turning the guide member, and a compressed air generating source operatively controlled by the sensor for supplying the compressed air to the nozzle.

With this construction, when the leading end of a slide fastener is detected by the sensor, the guide member is turned in one direction through an angle of 180 degrees to thereby overturn the slide fastener received in the guide channel. At the same time, compressed air is ejected from the nozzle to convey the overturned slide fastener. In response to the detection by the sensor of the trailing end of the slide fastener, the guide member is turned in the opposite direction through an angle of 180 degrees and the supply of compressed air to the nozzle is stopped.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 2 is a vertical cross-sectional view of the overturning conveyer shown in FIG. 1;

FIG. 3 is a view similar to FIG. 2, illustrating the manner in which a slide fastener is turned over by the overturning conveyer;

DETAILED DESCRIPTION

Figure 1:
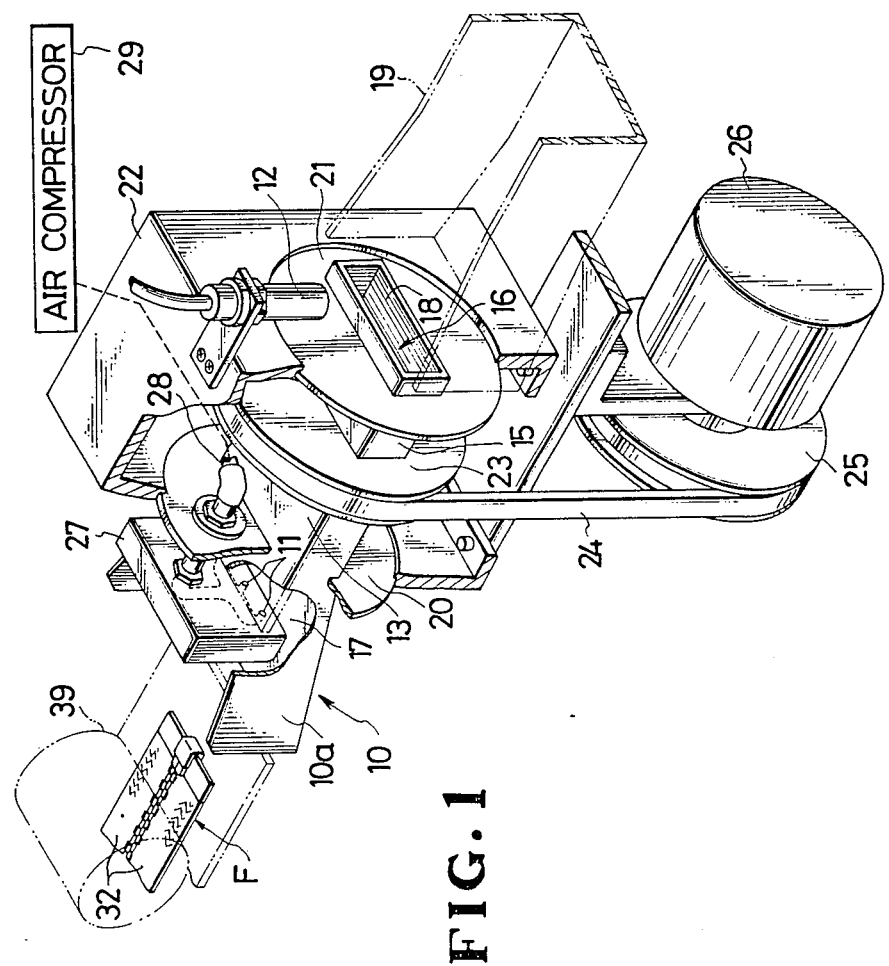
FIG. 1 is a fragmentary perspective view of a slide fastener overturning conveyer according to the present invention.

As shown in FIG. 1, a slide fastener overturning conveyer embodying the present invention generally comprises an elongate slide fastener guide member 10, a plurality of air nozzles 11 (two being shown) disposed in juxtaposition on the upstream side of the guide member 10, and a sensor 12 disposed on the downstream side of the guide member 10.

The guide member 10 has a hollow rectangular shape and is composed of a pair of upper and lower horizontal plates 13, 14 and a pair of vertical side plates 15, 15 interconnecting the horizontal plates 13, 14. The hollow guide member 10 has a longitudinal guide channel 16 through which slide fasteners F are fed one by one with their undersides facing upwardly. The guide channel 16 has an inlet 17 facing toward a preceding processing station of a slide fastener finishing machine (only a feed roller and a guide table being shown) for introducing the slide fasteners F into the guide channel 16, and an outlet 18 facing toward a subsequent packaging station for discharging the slide fasteners to the packaging station through a discharge chute 19. The guide member 10 also includes a flared trough-like integral extension 10a projecting from the inlet end of the guide member 10 for facilitating introduction of the slide fastener F.

The guide member 10 includes a pair of circular flanges 20, 21 projecting radially outwardly from opposite end portions of the guide member and rotatably supported by a box-like frame 22 so that the guide member 10 is rotatable about its longitudinal central axis. The guide member 10 further includes a driven pulley 23 disposed between the flanges 20, 21 and extending perpendicular to the longitudinal central axis of the guide member 10 for rotating the guide member 10. An endless belt 24 is trained around the pulley 23 and a drive pulley 25 which is coupled with the drive shaft of a rotary actuator 26. The rotary actuator 26 is constructed to drive the guide member 10 through the belt-driven pulleys 23, 25 to turn in opposite directions through an angle of 180 degrees. The rotary actuator 26, the drive and driven pulleys 23, 25 and the endless belt 24 jointly constitute a drive means for turning the guide members for the limited angular distance.

The air nozzles 11 are defined in a rectangular nozzle block 27 disposed adjacent to the inlet 17 of the guide channel 16 and held in abutment with an end edge of the upper horizontal plate 13, as shown in FIG. 2. The air nozzles 11 have respective air outlets opening into the guide channel 16 for directing streams of compressed air toward the outlet 18 of the guide channel 16. The other ends of the air nozzles 11 merge into an air inlet which is in turn connected through a pipe 28 to a compressed air generating source such as an air compressor 29. The pipe 28 extends perpendicularly through the circular flange 20 and is secured to the nozzle block 27 and the flange 20 so as to enable the nozzle block 27 to corotate with the guide member 10.

The sensor 12 is disposed adjacent to the outlet 18 of the guide channel 16 for detecting leading and trailing ends of each slide fastener F. The sensor 12 is operatively connected with the rotary actuator 26 and the air compressor 29 to control their operation. When the leading end of a slide fastener F is detected by the sensor 12, the rotary actuator 26 is driven to turn the guide member 10 in one direction through an angle of 180 degrees, thereby overturning the slide fastener F in the guide member 10 (FIG. 2–FIG. 3). At the same time, the air compressor 29 is operated to cause compressed air to be ejected from the air nozzles 11, thereby conveying the slide fastener F toward the discharge chute 19. When the sensor 12 detects the passage of the trailing end of the same slide fastener F, the rotary actuator 26 is driven to turn the guide member 10 in the opposite direction through an angle of 180 degrees (FIG. 3–FIG. 1). In this instance, the air compressor 29 is de-energized to block the supply of compressed air to the air nozzles 11. In the illustrated embodiment, the sensor 12 comprises a reflecting photoelectric sensor, however, it is possible to employ any other suitable sensor means.

Figure 4:
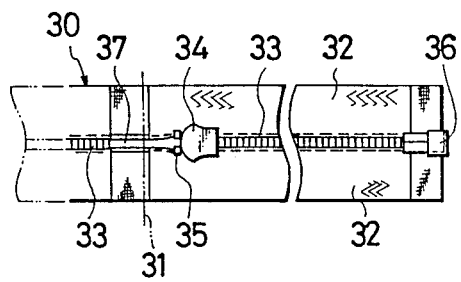
FIG. 4 is a fragmentary plan view of a continuous slide fastener chain from which slide fasteners of individual lengths are severed before they are turned over by the overturning conveyer.
Figure 6:
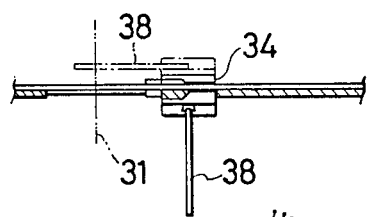
FIG. 6 is a side view of FIG. 4, illustrative of the posture of a slider pull tab.
Figure 7:
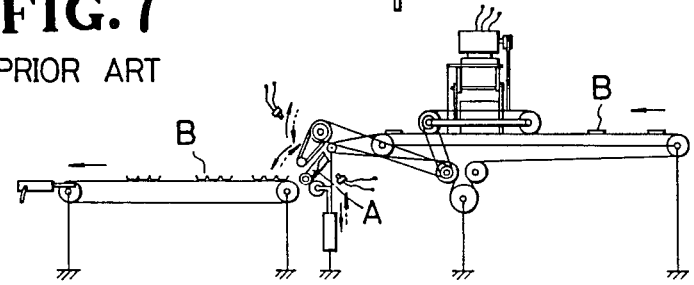
FIG. 7 is a schematic side elevational view of a known overturning apparatus.
Figure 8:
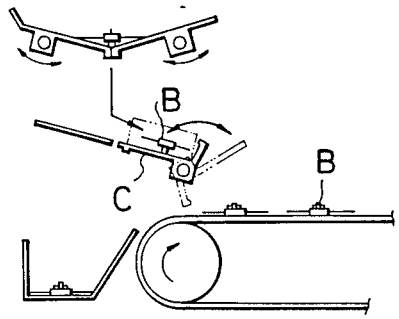
FIG. 8 is a schemtic side elevational view of another known overturning apparatus.

The slide fasteners F to be overturned by the overturning conveyer are produced by severing a continuous slide fastener chain 30 along a line of severance 31, as shown in FIG. 4. The slide fastener chain 30 includes a pair of slide fastener stringers 32, 32 having a plurality of longitudinally spaced chains of two rows of coupling elements 33, a plurality of sliders 34 (only one shown) mounted respectively on the coupling element chains 33, and end stops 35, 36 mounted on the opposite ends of each of the coupling element chains 33, there being an element-free space 37 between the successive coupling element chains 33. The slide fastener chain 30 are fed along a horizontal path through successive processing stations, such as an end-stop applying station and a stringer severing station. During that time, the slide fastener stringers 32 are kept upside down to hold a slide pull tab 38 of each slider 34 in a vertically depending posture so as not to interfere with the line of severance 31, as shown in FIG. 6. If the slide fastener chain 30 were fed with the front side of the fastener stringers 32 facing upwardly, the slider pull tab 38 would take a horizontal recumbent posture and extend across the line of severance 31, as indicated by phantom lines shown in FIG. 6 with the result that severing operation could not be achieved.

Figure 5:
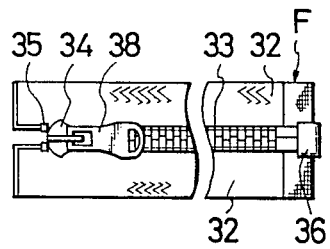
FIG. 5 is a fragmentary plan view of a slide fastener as it is turned over by the overturning conveyer.

FIG. 5 shows a slide fastener F after it has been turned over by the overturning conveyer of the present invention. In this condition, the slider pull tab 38 and the coupling elements 33 are exposed to the view. The slide fasteners while keeping this condition F are then transferred to a packaging station where they are packaged in a box or bound into a bundle of slide fasteners.

Operation of the overturning conveyer is described below with reference to FIGS. 1–3.

A slide fastener F, which has been severed from a continuous slide fastener chain 30 (FIG. 4), is fed by a feed roller 39 into the guide member 10. In this instance, the slide fastener stringers 32 are kept upside down, as shown in FIG. 1. When the leading end of the fastener stringers 32, on which a bottom end stop 36 is mounted, arrives at a position below the sensor 12, the sensor 12 sends electric signals to the rotary actuator 26 and the air compressor 29 to cause them to start their first mode of operation. That is, the rotary actuator 26 is driven to turn the guide member 10 in one direction through an angle of 180 degrees, thereby overturning the slide fastener F received in the guide member 10, as shown in FIG. 3. At the same time, the air compressor 29 is operated to cause compressed air to be ejected from the air nozzles 11 into a space left between the underside of the slide fastener F and the upper plate 13 (lower plate in FIG. 3). The slide fastener F is lifted and conveyed downstream by the force of compressed air.

A continuous conveyance of the slide fastener F causes the trailing end of the slide fastener F to move past the sensor 12 whereupon the sensor 12 sends electric signals to the rotary actuator 26 and the air compressor 29 to cause them to reverse their mode of operation. That is, the rotary actuator 26 is driven to turn the guide member 10 in the opposite direction through an angle of 180 degree, thereby returning the guide member 10 to its original position of FIG. 1, in preparation for the overturning conveyance of the next following slide fastener. The compressor 29 is de-energized to stop the supply of compressed air to the air nozzles 11. The foregoing cycle of operations is repeated to overturning successive slide fasteners while conveying them toward the discharge chute 19.

As the guide member 10 is angularly movable about its own longitudinal central axis, the overturning conveyer is relatively small and simple in construction as a whole. Furthermore, the slide fastener is received in the guide member 10 throughout its overturning movement with the result that the overturning conveyer is effectively operative even when the slide fastener is relatively long. The streams of compressed air flowing along the underside of the slide fastener enables damage-free overturning and floating-conveyance of the slide fasteners. The slide fasteners are gently discharged to the discharge chute 19 in neatly oriented disposition which enables convenient packaging at the next subsequent packaging station.

Obviously, many modifications and variations of the present invention are pressible in the light of the above teachings. It is therefore to be understood that within the scope of the appended claims, the invention may be practiced otherwise than as specifically described.

What is claimed is:

1. A slide fastener overturning conveyor comprising:
   (a) an elongate hollow rectangular guide member having a longitudinal guide channel for the passage of a slide fastener and rotatably movable about its longitudinal central axis through an angle of 180 degrees;
   (b) at least one air nozzle mounted in said guide member for corotation with said guide channel and disposed adjacent to an inlet of said guide channel for ejecting compressed air therefrom toward an outlet of said guide channel to assist in the conveyance of the slide fastener through said guide channel, said air nozzle being located beneath the slide fastener when said guide channel has been rotated;
   (c) a sensor disposed adjacent to said outlet of said guide channel for detecting leading and trailing ends of the slide fastener;
   (d) drive means operatively connected with said sensor for turning said guide member in response to the sensing of the slide fastener by said sensor; and
   (e) a compressed air generating source operatively connected with said sensor for intermittently supplying the compressed air to said nozzle in response to the sensing of the slide fastener by said sensor.

2. A slide fastener overturning conveyer according to claim 1, further including a frame, said guide member including at least one circular flange extending perpendicular to the longitudinal central axis of said guide member and rotatably supported by said frame.

3. A slide fastener overturning conveyer according to claim 2, further including a nozzle block defining therein said air nozzle, and a pipe secured to said nozzle block and said flange and connecting said nozzle in fluid communication with said compressed air generating means.

4. A slide fastener overturning conveyer according to claim 1, said drive means comprising a rotary actuator, a drive pulley coupled with said rotary actuator, a driven pulley mounted on said guide member for corotation therewith and extending perpendicular to the longitudinal central axis of said guide member, and an endless belt trained around said drive and driven pulleys.

5. A slide fastener overturning conveyer according to claim 1, including a nozzle block mounted on said guide member for corotation therewith and defining therein said air nozzle, said guide member including a pair of spaced upper and lower plates, said nozzle block being disposed in abutment with an end edge of said upper plate.

6. A slide fastener overturning conveyer according to claim 1, said guide member including a flared trough-like integral extension projecting from an inlet end of said guide member.

* * * * *